US008694236B2

(12) United States Patent
Takagi

(10) Patent No.: US 8,694,236 B2
(45) Date of Patent: Apr. 8, 2014

(54) ROAD ENVIRONMENT RECOGNITION DEVICE AND METHOD OF RECOGNIZING ROAD ENVIRONMENT

(75) Inventor: Kiyokazu Takagi, Okazaki (JP)

(73) Assignee: Denso Corporation, Kariya (JP)

( * ) Notice: Subject to any disclaimer, the term of this patent is extended or adjusted under 35 U.S.C. 154(b) by 869 days.

(21) Appl. No.: 11/789,178

(22) Filed: Apr. 24, 2007

(65) Prior Publication Data
US 2008/0040039 A1 Feb. 14, 2008

(30) Foreign Application Priority Data
May 17, 2006 (JP) ................................. 2006-138186

(51) Int. Cl.
*G06G 7/78* (2006.01)
(52) U.S. Cl.
USPC ........................................................ 701/300
(58) Field of Classification Search
USPC ............. 342/70–72; 701/300–302, 32.3, 408, 701/514, 519, 520; 340/994.24
See application file for complete search history.

(56) References Cited

U.S. PATENT DOCUMENTS

| | | | | |
|---|---|---|---|---|
| 4,809,178 A | * | 2/1989 | Ninomiya et al. ............ 701/200 |
| 5,229,941 A | * | 7/1993 | Hattori ............................. 701/26 |
| 5,307,419 A | * | 4/1994 | Tsujino et al. ................ 382/153 |
| 5,410,346 A | * | 4/1995 | Saneyoshi et al. ............ 348/116 |
| 5,483,453 A | * | 1/1996 | Uemura et al. ................. 701/23 |
| 5,555,312 A | * | 9/1996 | Shima et al. .................. 382/104 |
| 5,710,565 A | * | 1/1998 | Shirai et al. ..................... 342/70 |
| 5,754,099 A | * | 5/1998 | Nishimura et al. ........... 340/435 |
| 5,790,403 A | * | 8/1998 | Nakayama ....................... 701/28 |
| 5,904,725 A | * | 5/1999 | Iisaka et al. ................... 701/207 |
| 5,922,036 A | * | 7/1999 | Yasui et al. ...................... 701/28 |
| 5,955,967 A | * | 9/1999 | Yamada ........................ 340/904 |
| 5,991,427 A | * | 11/1999 | Kakinami et al. ............. 382/104 |
| 6,087,975 A | * | 7/2000 | Sugimoto et al. ............... 342/70 |
| 6,122,573 A | * | 9/2000 | Higashi et al. .................. 701/23 |
| 6,151,539 A | * | 11/2000 | Bergholz et al. ................ 701/25 |
| 6,265,991 B1 | * | 7/2001 | Nishiwaki et al. ............ 340/903 |

(Continued)

FOREIGN PATENT DOCUMENTS

| | | |
|---|---|---|
| DE | 10 2004 00385 | 8/2005 |
| JP | 7-134179 | 5/1995 |

(Continued)

OTHER PUBLICATIONS

Kiyokazu Takagi et al., "Road Environment Recognition Using In-Vehicle LIDAR", Jidosya Gizyutsukai 2006-199.

(Continued)

*Primary Examiner* — Thomas Black
*Assistant Examiner* — Sze-Hon Kong
(74) *Attorney, Agent, or Firm* — Harness, Dickey & Pierce, PLC

(57) ABSTRACT

A radar unit emits beams, and receives a reflection beam reflected by an object. A position of the object relative to a vehicle and an attribute of the object are recognized based on the emitted beams and the reflection beam. A coordinate position of the vehicle in an absolute coordinate is calculated based on a traveling amount of the vehicle, and a coordinate position of the object is calculated based on the calculated position of the vehicle and the position of the object relative to the vehicle. A road environment of the vehicle is recognized based on the coordinate positions and the attribute of the object.

16 Claims, 5 Drawing Sheets

(56) References Cited

U.S. PATENT DOCUMENTS

| | | | |
|---|---|---|---|
| 6,308,123 B1* | 10/2001 | Ikegaya et al. | 701/41 |
| 6,311,119 B2* | 10/2001 | Sawamoto et al. | 701/96 |
| 6,317,057 B1* | 11/2001 | Lee | 340/901 |
| 6,317,202 B1 | 11/2001 | Hosokawa et al. | |
| 6,324,452 B1* | 11/2001 | Ikegaya | 701/41 |
| 6,366,851 B1* | 4/2002 | Chojnacki et al. | 701/208 |
| 6,370,475 B1* | 4/2002 | Breed et al. | 701/301 |
| 6,385,539 B1* | 5/2002 | Wilson et al. | 701/468 |
| 6,393,361 B1* | 5/2002 | Yano et al. | 701/301 |
| 6,470,272 B2* | 10/2002 | Cong et al. | 701/301 |
| 6,480,789 B2* | 11/2002 | Lin | 701/301 |
| 6,484,087 B2* | 11/2002 | Shirai et al. | 701/96 |
| 6,553,282 B2* | 4/2003 | Shirai et al. | 701/1 |
| 6,567,039 B2* | 5/2003 | Shirai et al. | 342/70 |
| 6,577,334 B1* | 6/2003 | Kawai et al. | 348/148 |
| 6,581,005 B2* | 6/2003 | Watanabe et al. | 701/210 |
| 6,590,521 B1* | 7/2003 | Saka et al. | 342/70 |
| 6,591,000 B1* | 7/2003 | Oike et al. | 382/104 |
| 6,593,873 B2* | 7/2003 | Samukawa et al. | 342/70 |
| 6,652,376 B1* | 11/2003 | Yoshida et al. | 463/6 |
| 6,690,319 B2* | 2/2004 | Matsui et al. | 342/70 |
| 6,810,330 B2* | 10/2004 | Matsuura | 701/301 |
| 6,813,370 B1* | 11/2004 | Arai | 382/104 |
| 6,826,474 B2* | 11/2004 | Miyahara et al. | 701/209 |
| 6,853,906 B1* | 2/2005 | Michi et al. | 701/521 |
| 6,873,911 B2* | 3/2005 | Nishira et al. | 701/301 |
| 6,882,303 B2* | 4/2005 | Samukawa et al. | 342/70 |
| 6,927,699 B2* | 8/2005 | Samukawa et al. | 340/903 |
| 6,961,661 B2* | 11/2005 | Sekiguchi | 701/301 |
| 7,034,741 B2* | 4/2006 | Chon et al. | 342/42 |
| 7,034,742 B2* | 4/2006 | Cong et al. | 342/70 |
| 7,034,743 B2* | 4/2006 | Nakanishi et al. | 342/128 |
| 7,085,633 B2* | 8/2006 | Nishira et al. | 701/36 |
| 7,136,753 B2* | 11/2006 | Samukawa et al. | 701/301 |
| 7,151,479 B2* | 12/2006 | Beez et al. | 342/70 |
| 7,206,696 B2* | 4/2007 | Furukawa | 701/210 |
| 7,212,907 B2* | 5/2007 | Heinrichs-Bartscher | 701/96 |
| 7,216,023 B2* | 5/2007 | Akita | 701/41 |
| 7,218,207 B2* | 5/2007 | Iwano | 340/435 |
| 7,222,009 B2* | 5/2007 | Hijikata et al. | 701/41 |
| 7,228,212 B2* | 6/2007 | Hijikata et al. | 701/45 |
| 7,233,848 B2* | 6/2007 | Braeuchle et al. | 701/36 |
| 7,243,026 B2* | 7/2007 | Kudo | 701/301 |
| 7,248,968 B2* | 7/2007 | Reid | 701/301 |
| 7,272,482 B2* | 9/2007 | Kubota | 701/96 |
| 7,283,646 B2* | 10/2007 | Tamoto et al. | 382/104 |
| 7,411,485 B2* | 8/2008 | Jarlengrip | 340/435 |
| 7,482,916 B2* | 1/2009 | Au et al. | 340/475 |
| 7,496,449 B2 | 2/2009 | Samukawa et al. | |
| 7,509,211 B2* | 3/2009 | Niwa et al. | 701/417 |
| 7,522,091 B2* | 4/2009 | Cong et al. | 342/70 |
| 7,561,955 B2* | 7/2009 | Kubota | 701/96 |
| 7,589,623 B2* | 9/2009 | Oyaide | 340/476 |
| 7,623,680 B2* | 11/2009 | Takahama et al. | 382/104 |
| 7,626,533 B2* | 12/2009 | Cong et al. | 342/70 |
| 7,676,094 B2* | 3/2010 | Hoki et al. | 382/199 |
| 7,698,032 B2* | 4/2010 | Matsumoto et al. | 701/36 |
| 7,761,236 B2 | 7/2010 | Samukawa et al. | |
| 7,778,759 B2* | 8/2010 | Tange et al. | 701/96 |
| 7,840,330 B2* | 11/2010 | Heinrichs-Bartscher | 701/96 |
| 8,346,463 B2* | 1/2013 | Bargman et al. | 701/117 |
| 2001/0023389 A1* | 9/2001 | Hosokai et al. | 701/208 |
| 2003/0083818 A1* | 5/2003 | Tojima | 701/301 |
| 2004/0143381 A1* | 7/2004 | Regensburger et al. | 701/36 |
| 2004/0199398 A1* | 10/2004 | Kubota | 705/1 |
| 2005/0093735 A1 | 5/2005 | Samukawa et al. | |
| 2005/0225744 A1 | 10/2005 | Samukawa et al. | |
| 2005/0278112 A1* | 12/2005 | Gern et al. | 701/200 |
| 2006/0062482 A1* | 3/2006 | Adachi et al. | 382/242 |
| 2007/0021912 A1* | 1/2007 | Morita et al. | 701/211 |
| 2007/0032245 A1* | 2/2007 | Alapuranen | 455/456.1 |
| 2007/0043502 A1* | 2/2007 | Mudalige et al. | 701/207 |
| 2007/0168113 A1* | 7/2007 | Litkouhi et al. | 701/200 |
| 2010/0125414 A1* | 5/2010 | Okuyama et al. | 701/217 |

FOREIGN PATENT DOCUMENTS

| | | | | |
|---|---|---|---|---|
| JP | 8-44999 | | 2/1996 | |
| JP | 9-91594 | | 4/1997 | |
| JP | 2000-147124 | | 5/2000 | |
| JP | 2002-178864 | | 6/2002 | |
| JP | 2002-181936 | | 6/2002 | |
| JP | 2002225657 A | * | 8/2002 | B60R 21/00 |
| JP | 2004-171159 | | 6/2004 | |
| JP | 2004-184332 | | 7/2004 | |
| JP | 2005-010891 | | 1/2005 | |
| JP | 2005-107693 | | 4/2005 | |
| JP | 2005-227947 | | 8/2005 | |
| JP | 2007126086 A | * | 5/2007 | |
| JP | 2011098586 A | * | 5/2011 | |

OTHER PUBLICATIONS

Office action dated Aug. 3, 2010 in corresponding Japanese Application No. 2006-138186.

Office Action mailed on Nov. 10, 2010 from GPTO in the corresponding German Patent Application No. 102007021762.7 with English translation.

Office Action dated Mar. 22, 2011 in corresponding Japanese Application No. 2006-138186.

Office action dated Dec. 4, 2013 in corresponding German Application No. 10 2007 021 762.7.

* cited by examiner

FIG. 4

| | SHAPE/SIZE | REFLECTIVITY | POSITION | MOMENTUM | OTHERS |
|---|---|---|---|---|---|
| VEHICLE | RECTANGLE<br>CAR : 1.7m<br>TRUCK : 2.5m | REFLECTOR : HIGH<br>CHASSIS : LOW | ON LANE | LONGITUDINAL : LARGE<br>LATERAL : SMALL | REFLECTOR PAIR<br>LARGE REFLECTOR BOARD |
| SIGN | RECTANGLE,<br>CIRCLE<br>LARGE | HIGH | ROADSIDE<br>OVERHEAD | 0 | — |
| DELINEATOR | CIRCLE<br>SMALL | HIGH | ROADSIDE | 0 | INDICATIVE OF ROAD BOUNDARY |

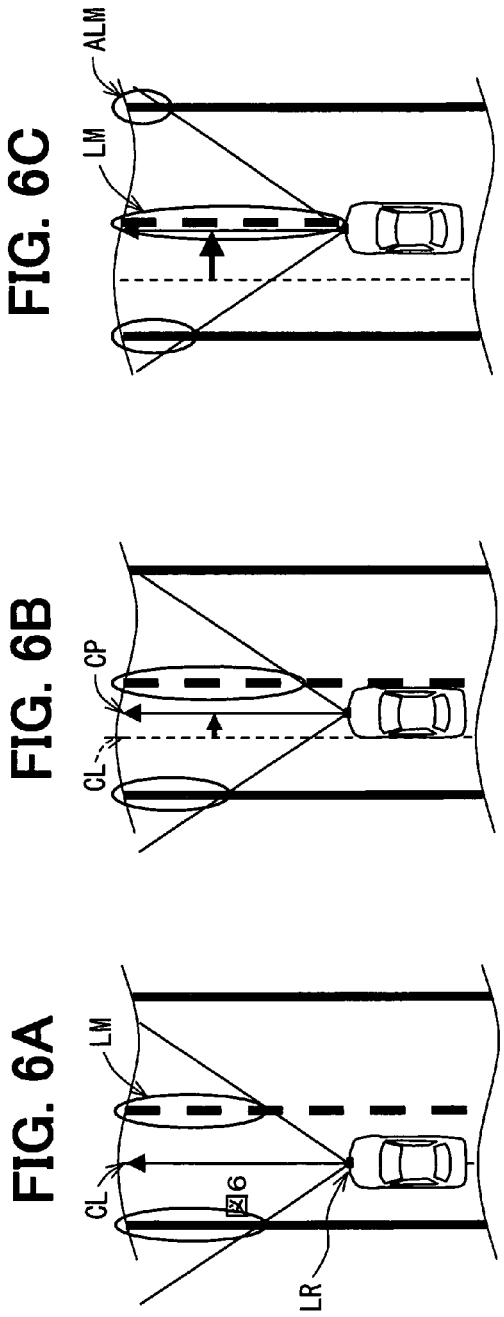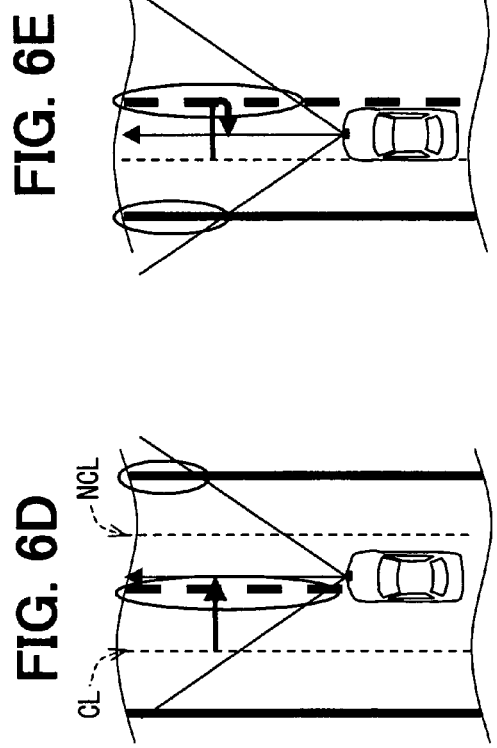

ROAD ENVIRONMENT RECOGNITION DEVICE AND METHOD OF RECOGNIZING ROAD ENVIRONMENT

CROSS REFERENCE TO RELATED APPLICATION

This application is based on Japanese Patent Application No. 2006-138186 filed on May 17, 2006, the disclosure of which is incorporated herein by reference in its entirety.

BACKGROUND OF THE INVENTION

1. Field of the Invention

The present invention relates to a road environment recognition device and a method of recognizing a road environment.

2. Description of Related Art

JP-A-2005-10891 discloses a road shape recognition device mounted to a vehicle. The vehicle is driven on a road, and the recognition device recognizes a shape of the road as a road environment. The recognition device includes a detecting sensor (e.g., laser-radar) detecting a forward object in front of the vehicle. The forward object is a candidate for a roadside structure forming the shape of the road. Further, position information of the forward object can be provided after the detecting sensor finishes the detection of the forward object. That is, the position information of the forward object can be provided both in the detection time and after the detection time. The shape of the road can be recognized based on the position information both in the detection time and after the detection time. The shape of the road can be accurately recognized, even if the number of the candidates in the detection time is small, because the position information after the detection time can be used.

The position information after the detection time can be provided by calculations. When the detecting sensor finishes the detection of the forward object, the position of the forward object is defined as an initial position. The position of the forward object after a sampling period is calculated by using movement information of the vehicle during the sampling period.

However, the recognition device detects only the forward object to be the candidate for the roadside structure. Therefore, the road environment cannot comprehensively be recognized.

SUMMARY OF THE INVENTION

In view of the foregoing and other problems, it is an object of the present invention to provide a road environment recognition device and a method of recognizing a road environment.

According to a first example of the present invention, a road environment recognition device includes a radar unit, an object recognizing element, a traveling amount measuring element, a coordinate position calculating element and a road environment recognizing element. The radar unit is mounted on a vehicle. The radar unit emits a plurality of beams in a predetermined angle range in a width direction and a height direction of the vehicle, and receives a reflection beam reflected by an object. The object recognizing element recognizes a position of the object relative to the vehicle and an attribute of the object based on results of the emitted plurality of beams and the reflection beam. The traveling amount measuring element measures a traveling amount of the vehicle. The coordinate position calculating element repeatedly calculates a coordinate position of the vehicle in an absolute coordinate having a predetermined point as an origin point based on the traveling amount measured by the traveling amount measuring element, and repeatedly calculates a coordinate position of the object based on the calculated position of the vehicle and the position of the object relative to the vehicle. The road environment recognizing element memorizes the coordinate positions of the vehicle and the object, and recognizes a road environment of the vehicle based on the memorized coordinate positions and the attribute of the object.

According to a second example of the present invention, a method of recognizing a road environment includes an emitting step, a recognizing step, a measuring step, a calculating step and a memorizing step. In the emitting step, a plurality of beams are emitted from a radar unit mounted on a vehicle in a predetermined angle range in a width direction and a height direction of the vehicle, and the beam is reflected by an object as a reflection beam. In the recognizing step, a position of the object relative to the vehicle and an attribute of the object are recognized based on results of the emitted plurality of beams and the reflection beam. In the measuring step, a traveling amount of the vehicle is measured. In the calculating step, a coordinate position of the vehicle in an absolute coordinate having a predetermined point as an origin point is calculated based on the traveling amount measured by the traveling amount measuring element, and a coordinate position of the object is calculated based on the calculated position of the vehicle and the position of the object relative to the vehicle. In the memorizing step, the coordinate positions of the vehicle and the object are memorized, and a road environment of the vehicle is recognized based on the memorized coordinate positions and the attribute of the object.

Accordingly, the road environment can be comprehensively recognized.

BRIEF DESCRIPTION OF THE DRAWINGS

The above and other objects, features and advantages of the present invention will become more apparent from the following detailed description made with reference to the accompanying drawings. In the drawings:

FIG. 4 is a table showing characteristics of model objects;

FIGS. 6A, 6B, 6C, 6D and 6E are diagrams showing a process of recognizing a lane change by using a position relationship between a lane mark and a vehicle.

DETAILED DESCRIPTION OF PREFERRED EMBODIMENT

Figure 1:
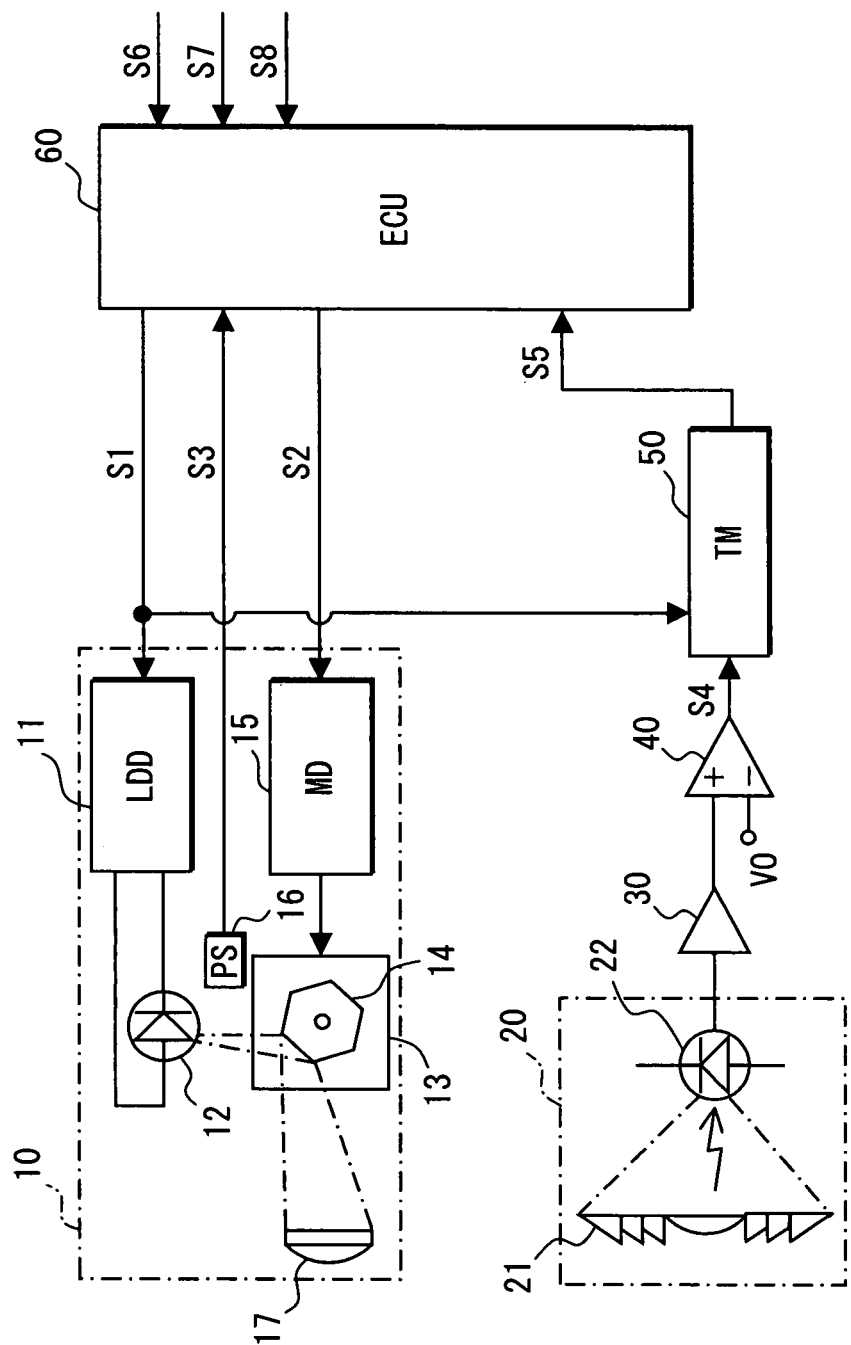
FIG. 1 is a schematic diagram showing a road environment recognition device according to an embodiment of the present invention.

As shown in FIG. 1, a road environment recognition device includes a laser-radar and an electrical control unit 60 (ECU). The laser-radar includes a light emitting portion 10 and a light receiving portion 20, which are mounted to a front part of a vehicle, and detects a forward object in front of the vehicle.

The light emitting portion 10 includes a semiconductor laser diode 12. The laser diode 12 emits pulse laser light through a scanner 13 and a light emitting lens 17. The laser diode 12 is connected to the ECU 60 through a laser diode driving circuit 11 (LDD), and radiates laser light in response to a driving signal (S1) output from the ECU 60. The scanner 13 includes a polygon mirror 14 as a reflector, and the polygon mirror 14 is driven by a motor (not shown). When a driving signal (S2) is input into a motor driving circuit 15 (MD) from the ECU 60, the motor driving circuit 15 drives the motor so as to rotate the polygon mirror 14. A position sensor 16 (PS) detects a rotation position of the motor, and outputs a signal (S3) of the rotation position of the motor into the ECU 60.

The polygon mirror 14 has six reflection faces, and a face angle is different among the six reflection faces. Therefore, when the polygon mirror 14 is rotated with a predetermined speed, and when the laser diode 12 intermittently emits laser light, the light emitting portion 10 can discontinuously emit and sweep (scan) laser light with a predetermined angle range in width and height directions of the vehicle.

The light receiving portion 20 includes a light receiving lens 21 for receiving laser light reflected by an object (not shown). The light receiving lens 21 transmits the reflection light to a light receiving element 22 (photo diode). The light receiving element 22 outputs a voltage corresponding to an intensity of the reflection light. The voltage output from the light receiving element 22 is amplified by an amplifier 30, and output into a comparator 40. The comparator 40 compares the output voltage with a reference voltage V0. When the output voltage is larger than the reference voltage V0, a predetermined light-receiving signal (S4) is output into a time measuring circuit 50 (TM).

The driving signal (S1) output from the ECU 60 into the laser diode driving circuit 11 is also input into the time measuring circuit 50. The time measuring circuit 50 encodes a first time period from the driving signal (S1) to the light-receiving signal (S4) into a binary digital signal. The first time period corresponds to a time difference between the emission of the laser light and the receiving of the reflection light. Further, a second time period, for which the output voltage is larger than the reference voltage V0, is also measured by the time measuring circuit 50. The time measuring circuit 50 encodes the second time period into the binary digital signal. Then, the binary digital signals are input into the ECU 60 as measurement time data (S5). The second time period is used as information indicating the intensity of the reflection light, because the second time period has a correlation with the intensity of the reflection light.

Here, a radiation area of laser light will be described. The light emitting portion 10 is capable of radiating four hundred and fifty one (451) laser light points with a beam step angle of 0.08 deg in the width direction of the vehicle. Therefore, the radiation area of laser light in the width direction of the vehicle is ±18 deg (=0.08 deg×451 points).

Figure 2:
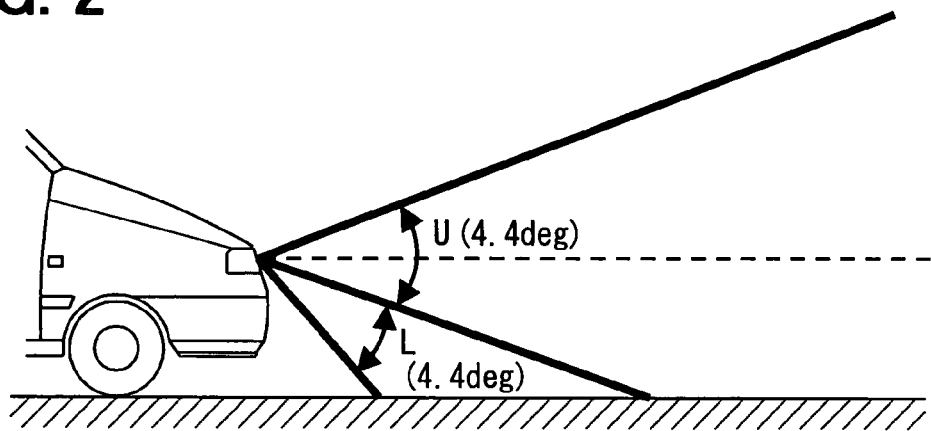
FIG. 2 is a diagram showing a radiation area of a laser-radar of the device.

The light emitting portion 10 is capable of radiating laser light having six layers in the height direction of the vehicle, due to the polygon mirror 14 having the six reflection faces. The six layers are constructed with upper three layers U and lower three layers L, as shown in FIG. 2. The upper three layers U are used for detecting a forward vehicle and a roadside object, e.g., a delineator or a traffic sign. In contrast, the lower three layers L are mainly used for detecting a lane line (lane mark), e.g., a painted white line, on a road face. Therefore, a direction of the lower three layers L is set so as to radiate laser light toward the road face.

Each laser layer has a beam angle of about 1.6 deg in the height direction of the vehicle. Radiation angel of laser light is set such that a part of the laser layer overlaps with adjacent laser layer in each of the lower three layers L and the upper three layers U. Thereby, resolution in the height direction of the vehicle can be improved. The overlap of the radiation angle is about 0.2 deg. Therefore, the radiation area by each of the upper three layers U and the lower three layers L is 4.4 deg (=1.6 deg×3 layers−0.2 deg×2 overlaps), as shown in FIG. 2.

The light emitting portion 10 radiates laser light in order to detect a forward object in front of the vehicle. At this time, the ECU 60 outputs the driving signal S1 into the light emitting portion 10 such that laser light two-dimensionally scans the radiation area. Due to the two-dimension scan, when the light receiving portion 20 receives the reflection light, the radiation angle of the laser light reflected by the forward object can be uniquely determined based on the reflection light.

Further, when the first time period from the driving signal (S1) to the light-receiving signal (S4) is input into the ECU 60, the ECU 60 calculates a distance to the forward object in front of the vehicle based on the first time period. The ECU 60 forms position data based on the distance and the radiation angle of the laser light. That is, the ECU 60 defines a center of the light emitting portion 10 and the light receiving portion 20 as an origin point (0, 0, 0), and defines X, Y and Z coordinates in a sensor coordinate, in which the width direction of the vehicle corresponds to an X-axis, the height direction of the vehicle corresponds to a Y-axis, and a longitudinal (back-and-forth) direction of the vehicle corresponds to a Z-axis. Further, the ECU 60 stores reflection light intensity data corresponding to the second time period for which the output voltage is larger than the reference voltage V0. The reflection light intensity data is separated into the X, Y and Z coordinates.

As shown in FIG. 1, a speed signal (S6) is input into the ECU 60 from a speed sensor for detecting a speed of the vehicle. A yaw rate signal (S7) is input into the ECU 60 from a yaw rate sensor for detecting a yaw rate applied to the vehicle. A steering angle signal (S8) is input into the ECU 60 from a steering angle sensor for detecting a steering angle of a steering wheel of the vehicle. The ECU 60 calculates a momentum (traveling amount) of the vehicle by using the signals S6, S7, S8.

Next, recognition treatment for comprehensively recognizing a road environment will be described. The recognition treatment using the laser-radar includes an object recognition process, a lane line recognition process and an integration process. In the object recognition process, a forward object in front of the vehicle is recognized by using laser light from the upper three layers U. In the lane line recognition process, a lane line (mark) is recognized by using laser light from the lower three layers L. In the integration process, results of the object and the lane line recognition processes are integrated so as to comprehensively recognize the road environment.

Figure 3:
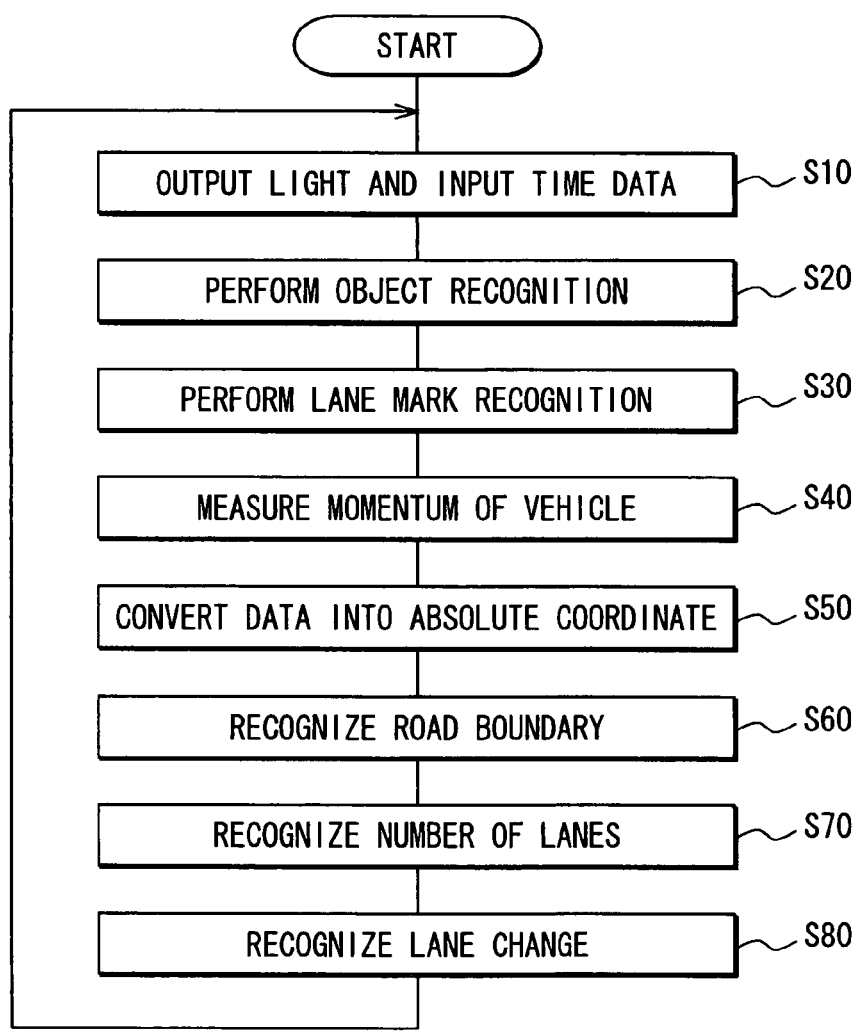
FIG. 3 is a flow chart showing a road environment recognition process.

As shown in FIG. 3, laser light is swept and radiated toward the radiation area, and the measurement time data (S5 in FIG. 1), i.e., the first and second time periods, are input into the ECU 60 after the light receiving portion 20 receives the reflection light (S10). The laser-radar has a detection period of 100 msec, for example.

The object recognition process is performed by using the reflection light corresponding to laser light from the upper three layers U (S20). Specifically, data clustering is performed for the forward objects detected by the laser-radar, and tracking is performed by using a Kalman filter. The Kalman filter is a two-stage Kalman filter in consideration of accelerated movement and stability for the vehicle.

In the data clustering, object data are separated into groups based on a distance between the object data, for example. Further, an attribute of the object is determined based on characteristics of predetermined model objects.

As shown in FIG. 4, the model object such as a vehicle, a sign or a delineator has characteristics such as a shape, size, reflectivity, position or momentum. For example, the vehicle has a rectangular shape. A car (small-size car) has a width of 1.7 m, and a truck (large-size car) has a width of 2.5 m. A reflector (reflector pair or large reflector board) of the vehicle has a high reflectivity, and a chassis of the vehicle has a low reflectivity. The vehicle is positioned on a lane. Momentum of the vehicle is large in the longitudinal direction, and is small in the lateral direction. The sign has a rectangular or circular shape, large size, high reflectivity, and no momentum. The sign is positioned overhead at the roadside. The delineator has a circular shape, small size, high reflectivity, and no momentum. The delineator is positioned at the roadside, and indicative of a road boundary. Thus, the attribute of the forward object can be determined by comparing the object data with the model object. If the object data has characteristics similar to the model object, the forward object is determined to be the model object. After the attribute of the forward object is determined, the determination result is stored in the ECU 60. Thus, even if data collection of the forward object is missed due to a shielding object, for example, the tracking of the forward object can be appropriately performed.

Then, the lane mark recognition process is performed by using laser light from the lower three layers L (S30 in FIG. 3). Thereby, the lane mark can be distinguished from the forward object. Because the lane mark includes glass beads, laser light emitted from the light emitting portion 10 can be reflected by the lane mark, and the reflection light can be transmitted to the light receiving portion 20.

Specifically, a Hough transform of the reflection light (signal) from the lane mark is performed, and a curvature of the lane mark and a lateral position of the vehicle relative to the lane mark are calculated. Further, a lane width is calculated from a distance between the lane marks at both sides of the vehicle. An area of extracting the lane mark can be defined by using these calculation results. Thus, tracking accuracy of the lane mark can be improved.

Due to steps S10-S30, the forward object and the lane mark can be recognized. Next, the integration process will be described, in which results of the forward object and the lane mark recognition processes are integrated so as to comprehensively recognize the road environment.

Momentum of the vehicle is measured based on the signals S6, S7, S8 output from the speed sensor, the yaw rate sensor and the steering angle sensor (S40 in FIG. 3). For example, when the yaw rate of the vehicle is integrated, a traveling direction (yawing angle) of the vehicle can be calculated. When the speed of the vehicle is integrated, the displacement amount of the vehicle in the traveling direction can be calculated.

Then, position of the vehicle in an absolute coordinate is calculated based on the momentum of the vehicle (S50). For example, the traveling direction of the vehicle is converted into a direction in the absolute coordinate, and the displacement amount of the vehicle is separated into a displacement amount $\Delta X$ in the X coordinate and a displacement amount $\Delta Y$ in the Y coordinate in the absolute coordinate. Then, the displacement amounts $\Delta X$, $\Delta Y$ are added to a last position (X, Y) of the vehicle in the absolute coordinate. Thus, present position of the vehicle $(X+\Delta X, Y+\Delta Y)$ can be calculated in the absolute coordinate.

An origin point of the absolute coordinate can be any point in a driving route. For example, a point at which the vehicle starts to be driven or a point at which the measurement is started may be the origin point of the absolute coordinate.

Thereby, the position of the vehicle in the absolute coordinate can be calculated based on only the momentum of the vehicle.

Thereafter, positions of the forward object and the lane mark are calculated based on a position relationship with the vehicle. The positions of the forward object and the lane mark are already calculated at steps S20 and S30 in the sensor coordinate having the origin point at the laser-radar. Here, the position of the vehicle (laser-radar) becomes a reference point in the sensor coordinate. Therefore, all position data of the forward objects detected in the past detection period has to be updated in accordance with a change of the position of the vehicle, in order to unify present position data and past position data.

However, in this embodiment, continuation with the past position data can be secured only by converting a latest data into the absolute coordinate, because the positions of the vehicle, the forward object and the lane mark are memorized after converted into the absolute coordinate. The positions of the forward object and the lane mark are already calculated relative to the laser-radar in the sensor coordinate. The sensor coordinate is rotated such that the Z-axis of the sensor coordinate corresponds to the traveling direction (yawing angle) of the vehicle in the absolute coordinate. Further, two-dimension coordinate having the X-axis and the Z-axis in the sensor coordinate is applied to the absolute coordinate. Thereby, the positions of the forward object and the lane mark in the absolute coordinate can be calculated.

Next, a road boundary is recognized due to a roadside object at a roadside end (S60 in FIG. 3). Most of the road boundaries are defined by the roadside object such as a guardrail or delineator. Especially, the road boundary in an expressway is defined by a line of the delineators. When the roadside object (delineator) is extracted and the line of the delineators is mathematically expressed, the road boundary can be recognized. Thus, movable space area for the vehicle is recognized based on a dimension between the road boundaries at both sides of the vehicle.

Figure 5:
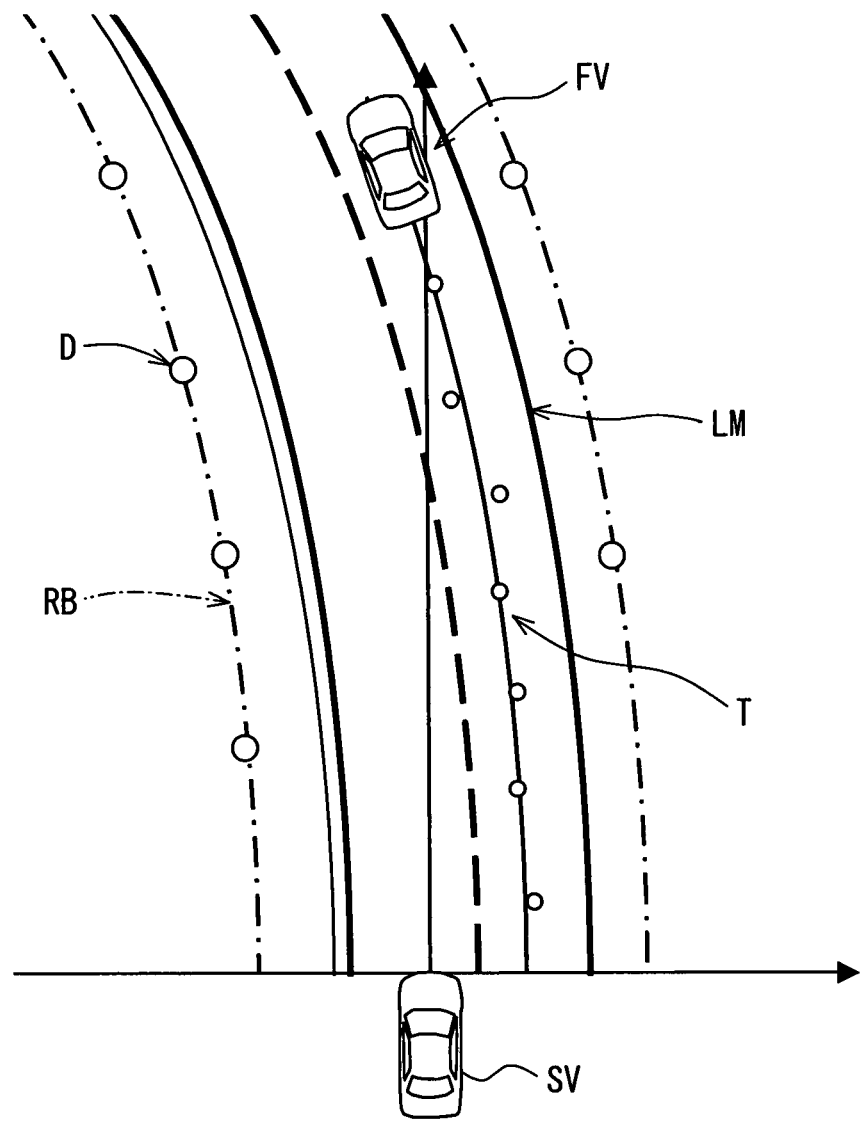
FIG. 5 is a diagram showing a road environment on an expressway.

FIG. 5 shows an example of the road environment in the expressway. The delineator D (roadside object) is fixed at a point in the absolute coordinate, because the delineator D is a stationary object. The points of the delineators D are connected in an order of being closer to a subject vehicle SV so as to form segments by using method of least squares. Thus, a road boundary RB can be recognized.

Here, the line of the delineators exists at both sides (left and right) of the subject vehicle SV. However, in this embodiment, the curvature of the road can be calculated based on the yaw rate and the vehicle speed, and the curvature of the road can be further calculated based on results of the process for recognizing the lane mark LM. Therefore, the line of the delineators D at both sides can be distinguished to be left or right by using the curvature of the road. That is, the delineator D can be accurately determined to exist at left side or right side of the subject vehicle SV. Further, when a forward vehicle FV exists in front of the subject vehicle SV, the delineator D can be determined to exist at the left side or right side of the subject vehicle SV based on a trajectory T of the forward vehicle FV.

Next, the number of the lanes is recognized (S70 in FIG. 3). The number of the lanes can be calculated based on the lane width calculated in the forward object and the lane mark recognition processes. Specifically, a space area having a width equal to or more than the lane width is determined to be left between the lane mark and the road boundary or not. The positions of the left and right lane marks are defined in the absolute coordinate based on the lane mark recognition process. If the space area having the lane width or more is determined to be left, another lane exists in the space area. If the space area having the lane width or more is determined not to be left, another lane does not exist in the space area. In this case, a side strip may exist between the lane mark and the road boundary. This determination is repeated until when the space area having the lane width or more is determined not to be left. Thus, the number of the lanes can be recognized. In addition, when plural lanes are recognized, the lane on which the vehicle is driven can be determined based on a position relationship between the vehicle and the lane mark in the absolute coordinate.

Here, when the forward vehicle exists, the positions of the forward vehicle in the absolute coordinate are connected into the segments so as to provide trajectory information. Thereby, the number of the lanes can be recognized, even if performance for recognizing the lane mark is low because the lane mark is not clear. The trajectory information of the forward vehicle can be calculated as shown in FIG. 5. Therefore, the number of the lanes can be estimated by counting the number of the trajectories of the forward vehicle not overlapping with the trajectory of the subject vehicle. Moreover, because the lane width in the expressway is constant, the number of the lanes can be estimated only if the road boundary is detected.

Next, a lane change is determined to be performed or not (S80 in FIG. 3). The recognitions of the road boundary and the lane mark may not be sufficient for recognizing the road environment. For example, when a distance between the vehicle and the road boundary is changed, the position of the vehicle may be changed relative to the road boundary, or the position of the road boundary may be changed due to a winding of the road. A reason for the change of the distance between the vehicle and the road boundary may not be determined. If the movement of the vehicle in a road space is accurately recognized in addition to the recognitions of the road boundary and the lane mark, the road environment of the vehicle can be accurately recognized. That is, if the lane change is recognized, the road environment of the vehicle can be accurately recognized.

The lane change is recognized based on a position relationship between the lane mark and the vehicle. Ordinarily, as shown in FIG. 6A, the vehicle is driven at an approximately center of lane CL. The laser-radar LR is mounted at an approximately center position of the vehicle. When the lane change is started, as shown in FIG. 6B, a center position CP of the vehicle departs from the center of lane CL. When a distance between the center position CP of the vehicle and the center of lane CL is increased, and becomes larger than a predetermined threshold value, the lane change is determined to be started. At this time, as shown in FIG. 6C, adjacent lane mark ALM is searched in an adjacent lane to which the vehicle is moved. When the vehicle crosses a lane mark LM, the lane change is determined to be finished. As shown in FIG. 6D, a new center of lane NCL is defined. Further, a distance between the new center of lane NCL and the center position CP of the vehicle is calculated. In contrast, when the lane change is not finished and the vehicle returns to the previous lane as shown in FIG. 6E, the previous center of lane CL is used for calculating the distance to the center position CP of the vehicle.

Because the lane change is accurately recognized, the movement of the vehicle can be accurately recognized. Thus, the road environment (e.g., road shape, distance to the forward vehicle, number of the lanes and lane on which the vehicle is driven) can be comprehensively recognized.

Therefore, the road environment recognition device in this embodiment can be used when the vehicle is automatically operated, so as to recognize the road environment. Further, the device can be used in an adaptive cruise control system and a lane keep assist system. The adaptive cruise control system enables the vehicle to automatically follow the forward vehicle. The lane keep assist system raises alarm when the vehicle goes off the lane, and works to prevent the vehicle from going off the lane.

Further, the recognition device can be effectively used in cooperation with a navigation device, because the recognition device can accurately recognize the road shape and the lane on which the vehicle is driven. For example, the recognition device recognizes the road shape, and matching between the road shape and map data of the navigation device is performed. Thus, accuracy for detecting the position of the vehicle can be improved, and the lane on which the vehicle is driven can be recognized. Therefore, the navigation device can perform an appropriate assistance of the lane change.

In a case where the recognition device has the cooperation with the navigation device, when the navigation device has a differential global positioning system (DGPS) capable of measuring an accurate position of the vehicle, the momentum (movement) of the vehicle is measured or corrected by using an output from the DGPS. Thereby, the accuracy for detecting the positions of the vehicle and the reflection object in the absolute coordinate can be improved. Further, the curvature of the road in front of the vehicle can be provided from the map data of the navigation device.

In this embodiment, the forward object and the lane mark are recognized only by the laser-radar. However, an image sensor may be secondarily used. The position information of at least a part of the detection object can be obtained due to the image sensor, and may be used together with the recognition result by the laser-radar. The image sensor may not detect the detection object at a high-contrast position such as an entrance or exit of a tunnel. However, the laser-radar can accurately detect the forward vehicle and the roadside object at the high-contrast position.

Such changes and modifications are to be understood as being within the scope of the present invention as defined by the appended claims.

What is claimed is:

1. A road environment recognition device comprising:
a radar unit on a subject vehicle, wherein the radar unit emits a plurality of beams in a predetermined angle range in a width direction and a height direction of the subject vehicle, and receives a plurality of reflection beams reflected by objects;
an object recognizing element recognizing a position of one object relative to the subject vehicle and an attribute of the one object based on a first portion of the emitted plurality of beams and the reflection beam;
a lane marker recognizing element recognizing a position of a lane mark relative to the subject vehicle based on a second portion of the emitted plurality of beams different than the first portion of the emitted plurality of beams and the reflection beam;
a traveling amount measuring element measuring a traveling amount of the subject vehicle;
a coordinate calculating element repeatedly calculating an absolute coordinate of the subject vehicle in an absolute coordinate system having a predetermined point as an origin point based on the traveling amount measured by the traveling amount measuring element, repeatedly calculating an absolute coordinate of the one object based on the calculated absolute coordinate of the subject vehicle and the position of the one object relative to the subject vehicle and repeatedly calculating an absolute coordinate of the position of the lane mark based on the calculated absolute coordinate of the subject vehicle and the position of the lane mark relative to the subject vehicle; and a road environment recognizing element memorizing a plurality of data points of the calculated absolute coordinates of the subject vehicle, memorizing a plurality of data points of the calculated absolute coordinates of the one object and memorizing a plurality of data points of the calculated absolute coordinates of the position of the lane mark, and recognizing a road environment of the subject vehicle by integrating the memorized plurality of data points of the absolute coordinates and the attribute of the one object with the memorized plurality of data points of the absolute coordinates of the position of the lane mark; wherein the lane mark representing a boundary of a lane on which the subject vehicle is driven;

the radar unit emits the first portion of the plurality of beams toward a forward area of the subject vehicle, and the second portion of the plurality of beams is radiated toward a road face;

the radar unit receives light reflected by the lane mark, when the second portion of the plurality of beams radiated toward the road face is reflected by the lane mark; and the road environment recognizing element recognizes a lane change of the subject vehicle based on a change of the absolute coordinate of the subject vehicle relative to the absolute coordinate of the lane mark in the absolute coordinate system;

wherein present data is unified with past data by updating all of the plurality of data points of the absolute coordinates of the one object detected in a past detection point in accordance with a change in position of the subject vehicle.

2. The road environment recognition device according to claim 1, wherein the object recognizing element recognizes the attribute of the one object based on at least shape information provided by a portion of the plurality of the reflection beams, and an intensity of the portion of the plurality of the reflection beams.

3. The road environment recognition device according to claim 1, wherein the road environment recognition device further recognizes a roadside object positioned at one side of a road, the road environment recognizing element recognizes a number of lanes on the road based on a lane width provided from a position of the roadside object and a position of the lane mark in the absolute coordinate system.

4. The road environment recognition device according to claim 3, wherein the road environment recognizing element recognizes the lane on which the subject vehicle is driven based on a position of the subject vehicle in the absolute coordinate system.

5. The road environment recognition device according to claim 3, further comprising:

a road curvature detecting element detecting a curvature of the road on which the subject vehicle is driven, wherein the road environment recognizing element distinguishes the recognized roadside object between a left side roadside object and a right side roadside object in accordance with the curvature of the road.

6. The road environment recognition device according to claim 1, wherein the road environment recognizing element further recognizes a forward vehicle driven in a forward area of the subject vehicle, the road environment recognizing element recognizes a number of lanes on the road based on a relationship between a driving trajectory of the forward vehicle and a driving trajectory of the subject vehicle in the absolute coordinate system.

7. The road environment recognition device according to claim 1, wherein the road environment recognizing element further recognizes a roadside object in a forward area of the subject vehicle, the road environment recognizing element recognizing the road environment based on the memorized absolute coordinates of the roadside object and another memorized absolute coordinate of another roadside object, which was detected in a past detection period.

8. The road environment recognition device according to claim 1, wherein:

the road environment recognizing element recognizes that the lane change has started when a distance between a center position of the vehicle and a center of the lane becomes larger than a predetermined threshold value; and the road environment recognizing element recognizes that the lane change is finished when the entire vehicle crosses the lane mark.

9. The road environment recognition device according to claim 1, wherein the road environment recognizing element forms a trajectory of the one object based on all of the memorized plurality of data points of the absolute coordinates of the one object.

10. The road environment recognition device according to claim 1, wherein continuation from the past data to the present data is secured only by converting latest data into the absolute coordinate.

11. The road environment recognition device according to claim 1, wherein the memorized plurality of data points of the calculated absolute coordinates of the one object are connected into segments to provide a trajectory of the one object.

12. A method of recognizing a road environment comprising:

emitting a plurality of beams from a radar unit mounted on a vehicle in a predetermined angle range in a width direction and a height direction of the vehicle and the plurality of beams are reflected by objects as a plurality of reflection beams;

recognizing a position of one object relative to the vehicle and an attribute of the one object based on a first portion of the emitted plurality of beams and the reflection beam reflected by the one object;

recognizing a position of a lane mark relative to the vehicle based on a second plurality of the emitted plurality of beams different from the first portion and the reflection beam;

measuring a traveling amount of the vehicle;

repeatedly calculating an absolute coordinate of the vehicle in an absolute coordinate system having a predetermined point as an origin point based on the measured traveling amount, repeatedly calculating an absolute coordinate of the one object based on the calculated absolute coordinate of the vehicle and the position of the object relative to the vehicle and repeatedly calculating an absolute coordinate of the position of the lane mark based on the calculated absolute coordinate of the vehicle and the position of the lane mark relative to the vehicle; and memorizing a plurality of data points of the calculated absolute coordinate of the vehicle, a plurality of data points of the one object and a plurality of data points of the position of the lane mark;

recognizing a road environment of the vehicle based on the memorized plurality of data points of the absolute coordinates of the vehicle and by integrating the memorized plurality of data points of the absolute coordinate of the one object, and the attribute of the one object with the memorized plurality of data points of the absolute coordinates of the position of the lane mark; wherein, the lane mark representing a boundary of a lane on which the vehicle is driven;

the radar unit emits the first portion of the plurality of beams toward a forward area of the vehicle, and the second portion of the plurality of beams is radiated toward a road face;

the radar unit receives light reflected by the lane mark, when the second portion of the plurality of beams radiated toward the road face is reflected by the lane mark;

the road environment recognizing element recognizes a lane change of the vehicle based on a change of the absolute coordinate of the vehicle relative to the absolute coordinate of the lane mark in the absolute coordinate system;

wherein present data is unified with past data by updating all of the plurality of data points of the absolute coordinates of the one object detected in a past detection point in accordance with a change in position of the vehicle.

13. The method of recognizing a road environment according to claim 12, further comprising:

recognizing a roadside object in a forward area of the vehicle, and memorizing absolute coordinates of the roadside object; wherein the step of recognizing the road environment of the vehicle is performed based on the memorized absolute coordinates of the roadside object and another memorized absolute coordinate of a past roadside object, which was detected in a past detection period.

14. The method of recognizing a road environment according to claim 12, wherein:

the road environment recognizing element recognizes that the lane change has started when a distance between a center position of the vehicle and a center of the lane becomes larger than a predetermined threshold value; and the road environment recognizing element recognizes that the lane change is finished when the entire vehicle crosses the lane mark.

15. The method of recognizing a road environment according to claim 12, further comprising forming a trajectory of the one object based on all of the memorized plurality of data points of the absolute coordinates of the one object.

16. The road environment recognition device according to claim 12, further comprising connecting the memorized plurality of data points of the calculated absolute coordinates of the one object into segments to provide a trajectory of the one object.

* * * * *